United States Patent [19]
Mueller et al.

[11] Patent Number: 6,052,411
[45] Date of Patent: Apr. 18, 2000

[54] IDLE MODE FOR DIGITAL SUBSCRIBER LINE

[75] Inventors: A. Joseph Mueller; Richard G. C. Williams, both of San Diego; John Rosenlof, La Mesa, all of Calif.

[73] Assignee: 3Com Corporation, Santa Clara, Calif.

[21] Appl. No.: 09/056,166

[22] Filed: Apr. 6, 1998

[51] Int. Cl.$^7$ ...................................................... H04B 1/38
[52] U.S. Cl. .......................... 375/222; 375/364; 370/459; 370/514; 379/93.06; 379/229; 379/93.05
[58] Field of Search .................................... 375/219, 220, 375/222, 223, 363, 364, 369, 370, 377; 370/503, 505, 450, 459; 379/93.01, 229, 93.05, 93.06

[56] References Cited

U.S. PATENT DOCUMENTS

| | | | |
|---|---|---|---|
| 4,569,062 | 2/1986 | Dellande et al. ........................ | 375/377 |
| 4,953,210 | 8/1990 | McGlynn et al. ......................... | 380/48 |
| 5,267,263 | 11/1993 | Feezel et al. ............................. | 375/222 |
| 5,668,857 | 9/1997 | McHale . | |
| 5,781,617 | 7/1998 | McHale et al. . | |
| 5,898,761 | 4/1999 | McHale et al. . | |
| 5,903,612 | 5/1999 | Van Der Putten et al. ............ | 375/316 |
| 5,905,781 | 5/1999 | McHale et al. . | |

*Primary Examiner*—Amanda T. Le
*Attorney, Agent, or Firm*—Fish & Richardson P.C.

[57] ABSTRACT

A system and method for generating and repetitively transmitting a single modulated symbol during idle periods in user data in a digital subscriber line (DSL) communication system. The modulated symbol to be transmitted is selected such that its spectral properties match those of user data modulated symbols. For an asynchronous DSL system, and variants thereof, a preferred idle symbol is the "superframe" synchronization symbol. A separate modulated symbol would indicate the end of the idle state. In the preferred embodiment, the end-of-idle symbol is the idle symbol shifted by a 180° phase shift. In a preferred embodiment, the transmitter in a DSL modem would calculate the idle state modulated symbol once at the start of the idle period and then simply repeat this symbol until the end of the idle period, in which case the transmitter would invert the final idle symbol. At the receiver, an idle state modulated symbol detector and phase detector are implemented. Symbol detection can be performed in the time-domain for faster and easier detection, requiring little processing power. Upon detection of a 180° phase shift of the idle symbol, the receiver would exit the idle mode. The invention includes method, apparatus, and computer program implementations.

54 Claims, 3 Drawing Sheets

IDLE MODE FOR DIGITAL SUBSCRIBER LINE

TECHNICAL FIELD

This invention relates to electronic communication systems, and more particularly to a system and method for generating an idle mode in a digital subscriber line communication system.

BACKGROUND

A significant amount of effort has been undertaken to use existing telephone lines for high speed data communications. As part of this effort, a number of Digital Subscriber Line (DSL) systems have been proposed. For example, a version known as Asymmetric Digital Subscriber Line (ADSL) provides a system that applies signals over a single twisted-wire pair that supports "plain old telephone service" (POTS) and high-speed duplex (simultaneous two-way) and simplex (from a network to the customer installation) digital services. Part of the proposed standard for ADSL is set forth in the Draft Proposed Revision of ANSI T1.413-1995—Interface Between Networks and Customer Installation—Asymmetric Digital Subscriber Line (ADSL) Metallic Interface (Sep. 26, 1997), which is hereby incorporated by reference.

A DSL system essentially encodes digital data as analog signals at very high data rates using special modems. Each user's link is conducted over twisted-pair conductors bundled with a large number of other twisted-pair conductors, each used at different times and for different purposes (e.g., voice only, data only, and both voice and data). The length of wire run from a user's remote transceiver to a central office transceiver may vary greatly from user to user. The physical environment of the system equipment varies over time due to temperature and humidity changes. A link may go online or offline at any time. Consequently, the analog DSL signals exists in a noisy, time varying environment. Accordingly, DSL systems use sophisticated equalizer training, echo canceling, and synchronization techniques to cope with these factors.

FIG. 1 is a block diagram of one embodiment of a prior art DSL system. A user's computer 10 is coupled to a DSL modem 12 through a bandwidth splitter 14 to a conventional telephone line 16 and thence to a telephone company (telco) system 18. The telco system 18 includes a DSL modem and necessary equipment to establish a link to, for example, the Internet. The splitter 14 separates voice band frequencies from higher data band frequencies. A conventional telephone 20 may be coupled to the splitter 14 for communication over the voice band frequencies.

The DSL modem 12 may include an internal processor to control overall operation of the modem, or may be controlled by the user's computer 10 running appropriate software (a "soft modem"). In the telco system 18, each DSL modem is typically implemented with a programmable digital signal processor (DSP) 22.

One characteristic of most DSL systems, and ADSL in particular, is that the probability is high that each user link will operate in an "always on" or "always connected" mode, and will be used primarily to transport Internet traffic. However, it is unlikely that any particular link will be in essentially constant use transmitting data. Thus, it is likely that a link will remain idle for extended periods of time during user inactivity and will transport blocks of data generated in bursts during user activity.

During idle time, a number of problems occur if no data is transmitted over a connected link. Synchronization between a user's remote transceiver and a central office transceiver may be lost since no signal is being sent. Training and echo canceling parameters may become "dated", since they are dynamically generated in response to varying conditions over the transport medium (conductor bundle). Hence, when a link exits idle mode, retraining would be required, reducing the responsiveness of the link.

One approach to overcoming this problem is to continuously send a sequence of meaningless data, such as all binary ones, from the processor controlling the modem 12. However, under present systems, encoding even a constant series of data signals results in a time-varying set of modulated symbols being output from the modem 12. Consequently, the receiving modem sees varying data that must be decoded and analyzed before a decision can be made that the data represents an idle code or signal. This requires significant computational power. Thus, for the telco system 18, each link to a user's computer 10 generally requires a dedicated modem. One consequence of this is that implementing a DSL system is expensive in terms of capital equipment. Another consequence is that electrical power consumption is high, since power usage in a DSP varies with computational requirements. In some telco installations, the amount of available electrical power is limited, thus limiting the number of modems that can be installed.

Accordingly, the inventors have determined that it would be useful to have a system and method for indicating an idle state in a DSL communication system that does not result in a loss of synchronization or require retraining, and which reduces processing load and electrical power consumption. The present invention provides such a system and method.

SUMMARY

The invention provides a system and method for generating and repetitively transmitting a single modulated symbol during idle periods in user data. In the preferred embodiment, the modulated symbol to be transmitted is selected such that its spectral properties match those of user data modulated symbols. For an ADSL system, and variants thereof, a preferred idle symbol is the "superframe" synchronization symbol. A separate modulated symbol would indicate the end of the idle state. In the preferred embodiment, the end-of-idle symbol is the idle symbol shifted by a 180° phase shift, which is equivalent to inverting the time domain samples.

In a preferred embodiment, the transmitter in a DSL modem would calculate the idle state modulated symbol once at the start of the idle period and then simply repeat this symbol until the end of the idle period, in which case the transmitter would invert the final idle symbol (possibly with the exception of the pilot carrier, which may be required for timing recovery). At the receiver, an idle state modulated symbol detector and phase detector are implemented. Symbol detection can be performed in the time-domain for faster and easier detection, requiring little processing power. Upon detection of a 180° phase shift of the idle symbol, the receiver would exit the idle mode.

During idle mode operation, the transmitter performs little or no processing while the receiver performs reduced complexity time-domain processing. Since few processing resources are required in the receiver to detect the idle symbol, less electrical power is used. For example, during idle mode, the telco system modem processor speed may be significantly reduced and modem sections may be powered down. Furthermore, the telco system DSP modems may be time-shared across multiple links while some links are idle.

The invention further allows resource sharing of user DSL modems by allowing modem processor resources to be multitasked with other applications (or conversely, allowing existing computer processor resources, used in implementing the modem control functions as a "soft modem", to be used for some other purpose) during idle data periods.

In another aspect, the invention includes a method for implementing an idle mode in a digital subscriber line communication system, comprising the step of transmitting an idle mode modulated symbol from a first modem to a second modem. The invention also includes apparatus and computer program implementations.

The invention thus provides for a very simple, yet robust, method for resource conservation during idle periods in data transmission in a DSL communication system that exploits the "bursty" nature of data traffic. The preferred embodiment of the invention is based on functions necessarily present in an implementation of the present ADSL specification and does not inhibit interoperability with existing ADSL modems. Furthermore, use of the proposed idle symbol during idle periods ensures that cross-talk levels in the transport medium (conductor bundle) remain constant independent of whether or not user data is being transmitted across a link. Finally, no additional latency is introduced when returning from idle mode. Although the proposed idle mode exploits non-continuous data transmission, this technique does not preclude the transmission of continuous data.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Overview

The following description is made in the context of using the invention as part of an ADSL communication system. However, it should be understood that the invention may be applied to any DSL or non-DSL communication system in which use of the invention would provide similar benefits.

The invention provides a system and method for generating and repetitively transmitting a single modulated symbol during idle periods in user data. The single modulated symbol thus differs from prior art transmission of a constant digital data stream, which is encoded into a time-varying set of modulated symbols. In the preferred embodiment, the modulated symbol to be transmitted is selected such that its spectral properties match those of user data modulated symbols. Accordingly, the present invention allows repetitive use of a stored idle symbol having spectral characteristics that are the same as data. The receiver need only compare each received symbol in the time domain for identity to determine that an idle symbol has been received, thus reducing computational requirements.

Figure 1:
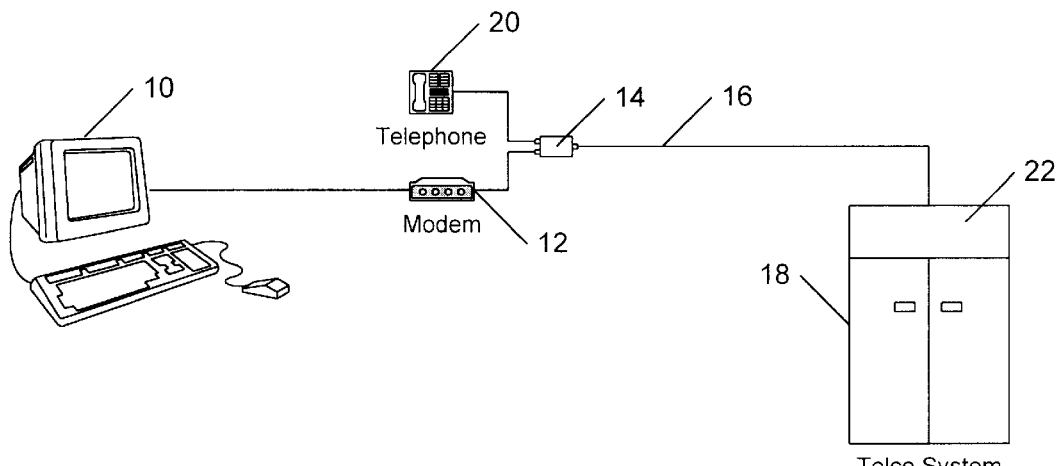
FIG. 1 is a block diagram of one embodiment of a prior art DSL system.
Figure 2:
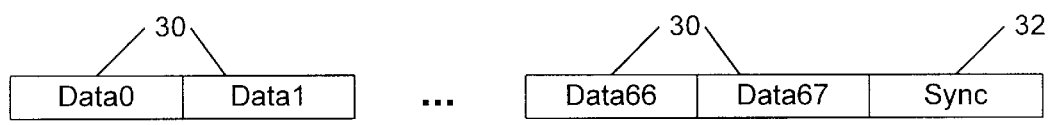
FIG. 2 is a diagram of a "superframe" for one type of prior art DSL system.

For an ADSL system, and variants thereof, a preferred idle symbol is the "superframe" synchronization symbol. FIG. 2 is a diagram of a "superframe" for one type of prior art DSL system, in this case, an ADSL system. Data is transmitted in individual frames 30 in accordance with the ADSL standard. Under that standard, 68 data frames define a "superframe" which is terminated by a superframe synchronization frame 32.

Figure 3:
FIG. 3 is a diagram of a "superframe" for a DSL system in accordance with the invention, showing a constant transmission of idle symbols.

When a modem 12, 22 determines that no data is being sent or received, a command may be issued to enter the idle state. Thereafter, in each superframe, each normal data frame 30 is replaced by the superframe synchronization frame 32. FIG. 3 is a diagram of a "superframe" for a DSL system in accordance with the invention, showing a constant transmission of idle symbols 34, the contents of which are identical to the contents of the superframe synchronization frame 32 of FIG. 2. If the selected idle symbol is different from the superframe synchronization frame 32, the idle symbol could be sent within a superframe bounded by the superframe synchronization frame 32. However, a preferred implementation would omit the superframe synchronization frame 32 completely, sending only the idle symbol.

The embodiment described above is particularly well-suited for a DSL discrete multitone (DMT) system, which has a symbol that spans many time samples. This length is exploited by the preferred embodiment. Other modems have very short symbols in comparison. To apply the invention to such modems, several symbols may be concatenated as an "idle block". Accordingly, an idle "symbol" may comprise one or more system-dependent symbols.

Figure 4:
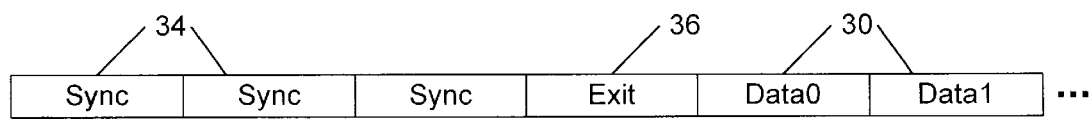
FIG. 4 is a diagram of a data stream for a DSL system in accordance with the invention, showing exiting from the idle state.

A separate modulated symbol would indicate the end of the idle state. In the preferred embodiment, the exit symbol is the idle symbol shifted by a 180° phase shift. FIG. 4 is a diagram of a data stream for a DSL system in accordance with the invention, showing exiting from the idle state. As in FIG. 3, during the idle state, each normal data frame 30 is replaced by the superframe synchronization frame 32. When a modem 12, 22 determines that data is to be sent or received, a command may be issued to exit the idle state. Thereafter, an exit symbol 36 is generated and transmitted. Upon detection, the receiver assumes the next symbol is the first symbol of the first superframe following the idle period interruption. The latency of this approach is one modulated symbol, and thus has no effect on the data latency and imposes no additional buffering requirements. Since the receiver has been receiving a steady stream of idle symbols that are also superframe synchronization frames 32, exiting the idle state can be done at any time, allowing data frames 30 to be sent immediately after the exit symbol 36. Using the idle symbol shifted in phase by 180° is easy to implement and detect, since a 180° phase shift is equivalent to inverting the time domain samples. However, any desired code could be used to indicate an exit from the idle state.

For implementation under the ADSL standard, the selection of the superframe synchronization symbol as the idle symbol means that no additional complexity is required, as both the symbol generator and 180° phase shifter are currently specified in the standard or are trivial to implement under the standard. Furthermore, this symbol is currently used during initialization and can therefore be used to refine any adaptive elements in the receiver without any additional complexity.

More particularly, the receiver need only completely decode and verify the first idle symbol. For all subsequent symbols, a time domain correlation can be performed at the analog-to-digital symbol level with the previous symbol. The time domain correlation can be performed at a reduced sampling rate, which may be important if a single DSL modem in the telco system 18 is to be shared by many idle connections.

Idle Mode Negotiation

Negotiation between each modem transmitter and receiver is required in order to signal when to enter idle mode. Although expedient entry into idle mode may be desired, the latency of such a transition has no effect on the user. In fact, legacy DSL modems not supporting idle mode would simply never enter idle mode (infinite latency). The same is not true when exiting the idle mode. In this case, any introduced latency greater than one modulated symbol period would be directly applied to the user data and would force buffering at the transmitter. However, this problem can be overcome using the exit symbol described above.

Due to the full duplex requirements of various indicator bits in a DSL system like the ADSL standard, both the upstream and downstream directions must be idled at essentially the same time and on superframe boundaries. However, this does not imply that the superframes in the two directions must be synchronized or that loop-timing is required.

One way of performing the necessary negotiation into the idle mode is to use the ADSL Overhead Control (AOC) channel provided in the ADSL standard, or a like channel provided under other DSL standards. Two new commands can be added to the Dynamic Rate Adaptation command set of the ADSL standard:

DRA_Idle_Request: Generated at either the user's modem or the telco central office modem, this command would signal a request to enter idle mode at a particular superframe boundary, as specified by the superframe counter.

DRA_Idle_Reply: Generated at the receiver, this command would be a response to the DRA_Idle_Request.

Some provision is required to abort entry into idle mode if data appears at the transmitter after negotiation for entering idle mode has been initiated but not completed. One way of handling this is to send the exit symbol described above to indicate the end of the idle period and then follow with the next data frame. This approach would introduce a latency before data transmission of one symbol period. Alternatively, the transmitter could abort entering idle mode and transmit the next data frame without incurring any additional latency. However, this approach would require that the receiver verify the first idle symbol in order to determine whether entry into the idle mode has been aborted.

In an embodiment particular suited for an ADSL communication system having an AOC channel, the Idle Request message may be 3 bytes long (AOC header byte, idle request command, superframe counter value). The AOC requires that the AOC messages be repeated 5 times and therefore the whole message would be 15 bytes long. For the majority of time, this will be transmitted in one superframe. Similarly, the Idle Reply may be two or three bytes in length, and thus could also be transmitted in one superframe. Thus, the typical delay due to negotiation can be kept to two superframes, or about 35 msec. To avoid bogging down the AOC channel with Idle Requests, a timer can be provided such that an Idle Request can be sent only if the AOC channel is idle for a specified time period.

Idle Symbol Generation

In a preferred embodiment, the transmitter in a DSL modem would calculate the idle state modulated symbol once at the start of the idle period and then simply repeat this symbol until the end of the idle period. To exit the idle mode, the transmitter would invert the final idle symbol (possibly with the exception of the pilot carrier, which may be required for timing recovery) to form the exit symbol 36. The superframe synchronization symbol is short enough that it can be readily stored rather than continuously generated. The inverse signal is easily calculated by changing the sign of the superframe synchronization symbol.

At the receiver, an idle state modulated symbol detector and phase detector are implemented. Symbol detection can be performed in the time-domain for faster and easier detection, requiring little processing power—as little as 5% or less of the power required to detect and decode conventional idle signals.

Figure 5:
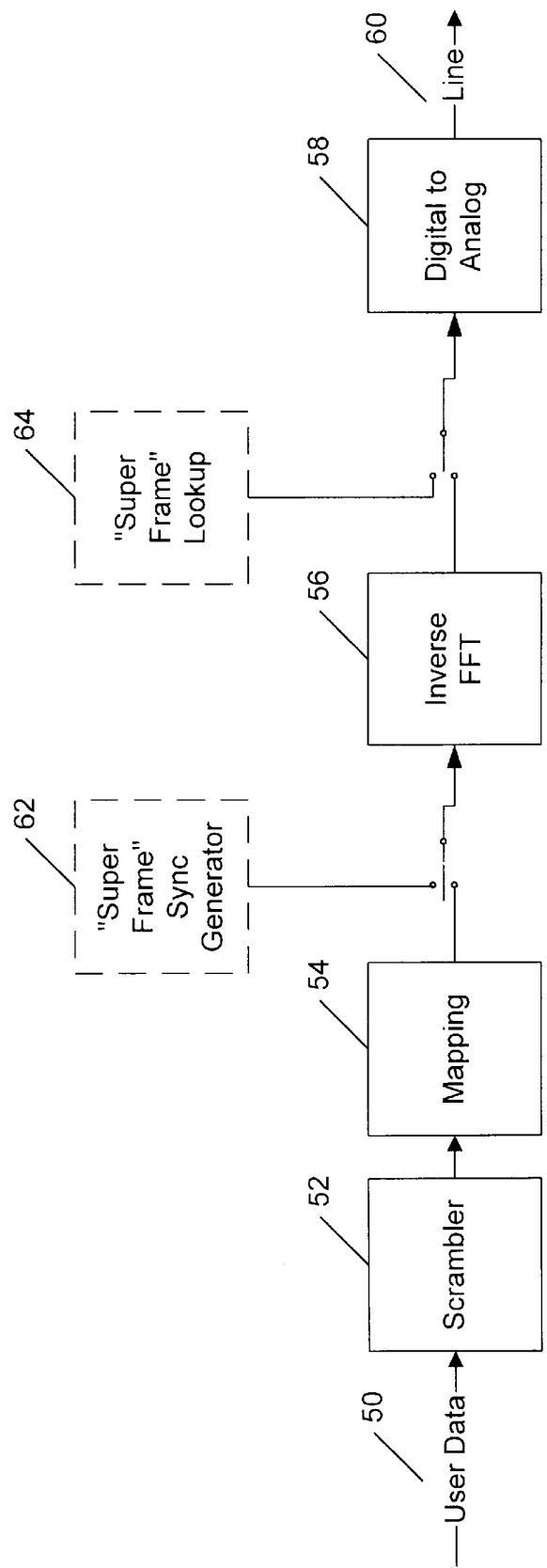
FIG. 5 is a block diagram of two alternative idle state modulation symbol encoding circuits for a DSL system in accordance with the invention.

FIG. 5 is a block diagram of two alternative idle state modulation symbol encoding circuits for a DSL DMT system in accordance with the invention. User data 50 is applied in conventional fashion to a scrambler 52, the output of which is coupled to a mapping function 54. During transmission of user data, the output of the mapping function 54 is coupled to an inverse fast Fourier transform (FFT) function 56, and the output of the inverse FFT function 56 is coupled to a digital to analog (D/A) converter 58. The analog output of the D/A converter 58 is output on a telecommunications line 60.

When a determination is made to enter the idle state, in one embodiment, a superframe sync generator 62 is switched into place as the input to the inverse FFT function 56. The superframe sync generator 62 simply repetitively generates the superframe synchronization symbol during every data frame. That symbol is uniformly transformed and converted to a single analog modulated symbol output from the D/A converter 58. Thus, the receiver sees the same modulated symbol during every data frame while in idle mode.

In an alternative embodiment, instead of using a superframe sync generator 62, a "superframe" lookup table 64 is switched into place as the input to the D/A converter 58. This table simply stores the binary values corresponding to an inverse FFT transformation of the superframe synchronization symbol. That value is uniformly converted to a single analog modulated symbol output from the D/A converter 58. Again, the receiver sees the same modulated symbol during every data frame while in idle mode.

Receiver Processing

Figure 6:
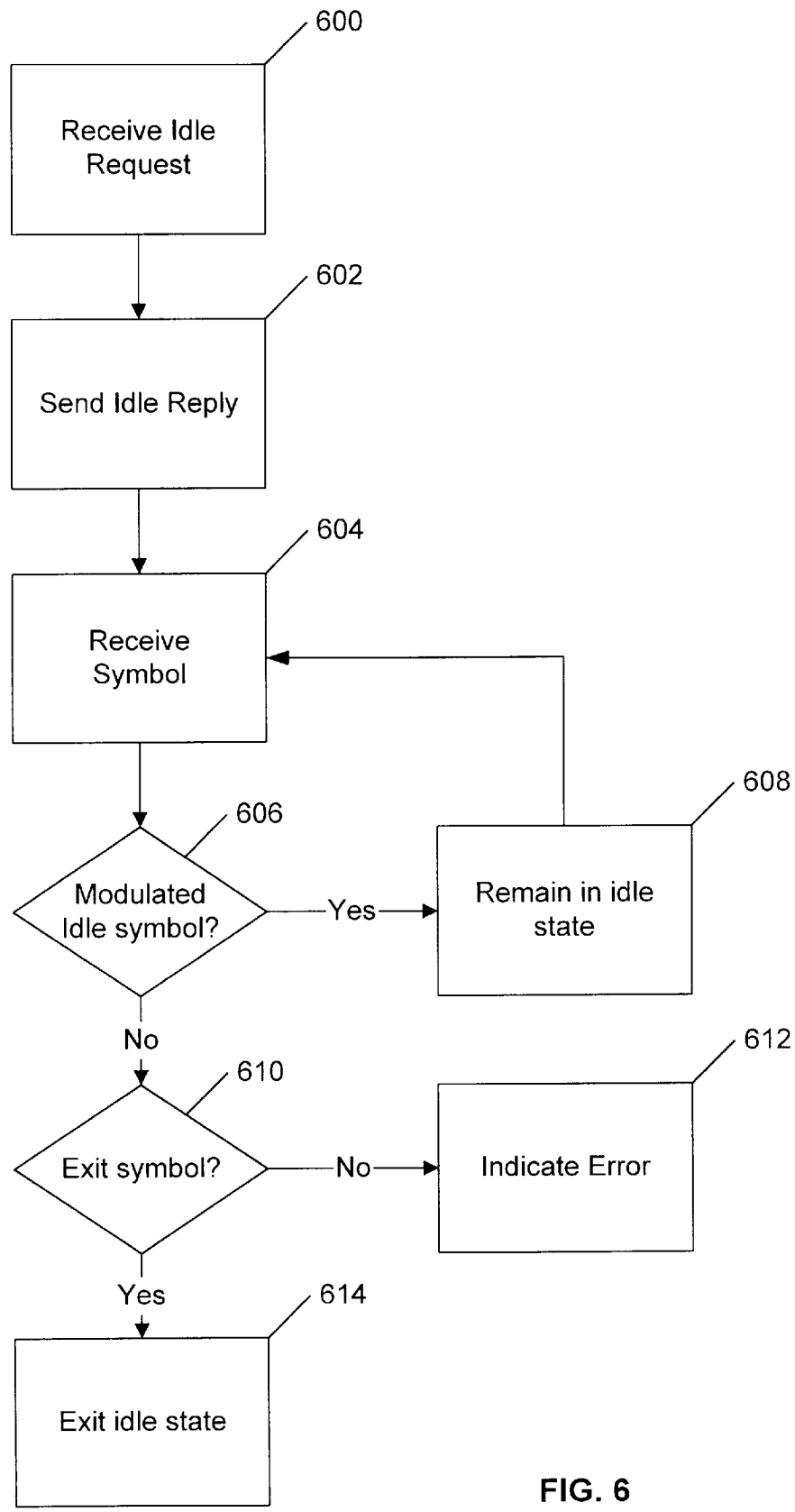
FIG. 6 is a flow chart showing one method for practicing the invention.

FIG. 6 is a flow chart showing one method for practicing the invention. The flowchart is from the point of view of a receiver. Initially, the receiver receives an Idle Request from a transmitter (STEP 600). The receiver then sends an Idle Reply (STEP 602) to complete the negotiation. Thereafter, the receiver receives a symbol from the transmitter (STEP 604). If the symbol is an idle state modulated symbol (STEP 606), the receiver remains in the idle state (STEP 608) and waits to receive the next symbol (STEP 604).

If a received symbol is not an idle state modulated symbol (STEP 606), the receiver tests to see if the symbol is the exit symbol (STEP 610). If not, an error may be indicated (STEP 612). If so, the receiver exits the idle state (STEP 614).

An advantage of the selected idle symbol is that it may be used to maintain timing and to keep the time domain equalizer (TEQ) and frequency domain equalizer (FEQ) in the receiver up-to-date. That is, since the channel will change (especially during long idle periods), the receiver may wish to use the idle symbol to update or refine the training of its TEQ and FEQ filter coefficients. The idle symbol selected has the necessary properties to perform such TEQ and FEQ updates because it is wideband. However, such updating requires significantly more processing power. Accordingly, the receiver may elect to perform this retraining only once every N symbols and thus not expend too much processor resources on average. Furthermore, in a DMT ADSL system, it may be desirable to recalculate the signal-to-noise for each of the DMT carriers from the idle symbol to determine if the current modem operating parameters are still applicable. If not, the receiver may elect to exit idle mode specifically to re-negotiate the parameters and then automatically resume the idle mode once re-negotiated. This is particularly important if the channel is in a "good" state before entering idle mode but degrades during idle mode. If this were to occur, and the modem were to assume the presence of a good channel when the modem exited idle mode, there is a good chance that the error rate may be so high as to force a lengthy retraining procedure, in which case some of the benefits of idle mode may be lost.

Other Advantages

Additional advantages of the invention include the following:

The invention does not affect the operating environment of the transport medium (conductor bundle), allows for modem training during idle mode, and introduces no additional latency or buffering requirements.

The preferred idle signal has wideband spectral characteristics. By using a wideband idle signal with the same spectral properties of the data bearing signal, the near-end crosstalk and far-end crosstalk conditions of the link are independent of each modem's mode of operation.

Because the idle signal is a known wideband signal, the receiver may choose to refine its training during idle mode.

Switching from idle mode to data mode requires one modulated symbol period, which is the amount of time required to collect the first data symbol. Thus, no additional latency is introduced.

The preferred ADSL embodiment requires little additional complexity by using the AOC channel for idle mode negotiation and the superframe synchronization symbol as the idle symbol. Implementing both the transmitter side and receiver side would only require a simple state machine.

Because the channel typically does not change significantly from symbol to symbol, no equalization is required, nor is timing recovery. It may even be possible to eliminate echo cancellation since both transmission directions are simultaneously idle and therefore the echo will remain constant.

Because the idle symbol is being repeated and a correlation is performed between subsequent symbols, inter-symbol interference will be constant and will not change from symbol to symbol, and thus will have no effect on the correlation.

When the exit symbol is detected, it may be fully processed and used as a retraining symbol to restore the link timing.

The invention is particularly suited for implementation in the proposed ITU G.dmt and G.lite standards.

Software Implementation

Implementation of other aspects of the invention follow readily from knowledge of the basic invention. The invention may be implemented in hardware or software, or a combination of both. If the invention is implemented in software, it may be configured as one or more computer programs executing on a processor comprising at least one processor element, a data storage system (including volatile and non-volatile memory and/or storage elements), at least one input port, and at least one output port. Program code is applied to input data to perform the functions described herein and generate output information. The output information is applied to one or more output ports or devices, in known fashion.

Each such computer program is preferably stored on a storage media or device (e.g., ROM or magnetic diskette) readable by a general or special purpose programmable processor, for configuring and operating the processor when the storage media or device is read by the processor to perform the procedures described herein. The inventive system may also be considered to be implemented as a computer-readable storage medium, configured with a computer program, where the storage medium so configured causes a computer or processor to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for implementing an idle mode in a digital subscriber line communication system, including the steps of:

(a) generating an idle mode modulated symbol once for each idle mode;

(b) repeatedly transmitting the idle mode modulated symbol from a first modem to a second modem.

2. The method of claim 1, wherein the idle mode modulated symbol has wideband spectral characteristics.

3. The method of claim 1, wherein the digital subscriber line communication system includes superframes having a superframe synchronization frame, further including the step of transmitting the superframe synchronization frame as the idle mode modulated symbol.

4. The method of claim 1, further including the step of exiting the idle mode by transmitting an exit symbol from either modem to the other modem.

5. The method of claim 4, wherein the exit symbol is essentially the inverse of the idle symbol.

6. The method of claim 1, further including the step of training at least one of the modems during the idle mode using the idle mode modulated symbol.

7. The method of claim 1, further including the steps of:

(a) exiting the idle mode from time to time;

(b) performing an equalization function in at least one of the modes outside of the idle mode;

(c) automatically resuming the idle mode.

8. The method of claim 1, wherein the digital subscriber line communication system is a discrete multitone digital subscriber line communication system.

9. A method for implementing an idle mode in a digital subscriber line communication system, including the steps of:

(a) providing data representing an idle mode modulated symbol once for each idle mode;
(b) transforming such data into a single idle mode modulated symbol;
(c) repeatedly transmitting the single idle mode modulated symbol from a first modem to a second modem during the idle mode.

10. The method of claim 9, wherein the idle mode modulated symbol has wideband spectral characteristics.

11. The method of claim 9, wherein the digital subscriber line communication system includes superframes having a superframe synchronization frame, further including the step of transmitting the superframe synchronization frame as the idle mode modulated symbol.

12. The method of claim 9, further including the step of exiting the idle mode by transmitting an exit symbol from either modem to the other modem.

13. The method of claim 12, wherein the exit symbol is essentially the inverse of the idle symbol.

14. The method of claim 9, further including the step of training at least one of the modems during the idle mode using the idle mode modulated symbol.

15. The method of claim 9, further including the steps of:
(a) exiting the idle mode from time to time;
(b) performing an equalization function in at least one of the modes outside of the idle mode;
(c) automatically resuming the idle mode.

16. The method of claim 9, wherein the digital subscriber line communication system is a discrete multitone digital subscriber line communication system.

17. A method for implementing an idle mode in a digital subscriber line communication system, including the steps of:
(a) generating an idle mode modulated symbol once for each idle mode;
(b) repeatedly transmitting the idle mode modulated symbol from a first modem to a second modem; and
(c) exiting the idle mode by transmitting an exit symbol from either modem to the other modem.

18. A computer program, residing on a computer-readable medium, for implementing an idle mode in a digital subscriber line communication system, including instructions for causing a computer to:
(a) generate an idle mode modulated symbol once for each idle mode;
(b) repeatedly transmit the idle mode modulated symbol from a first modem to a second modem.

19. The computer program of claim 18, wherein the idle mode modulated symbol has wideband spectral characteristics.

20. The computer program of claim 18, wherein the digital subscriber line communication system includes superframes having a superframe synchronization frame, further including instructions for causing a computer to transmit the superframe synchronization frame as the idle mode modulated symbol.

21. The computer program of claim 18, further including instructions for causing a computer to exit the idle mode by transmitting an exit symbol from either modem to the other modem.

22. The computer program of claim 21, wherein the exit symbol is essentially the inverse of the idle symbol.

23. The computer program of claim 18, further including instructions for causing a computer to train at least one of the modems during the idle mode using the idle mode modulated symbol.

24. The computer program of claim 18, further including instructions for causing a computer to:
(a) exit the idle mode from time to time;
(b) perform an equalization function in at least one of the modes outside of the idle mode;
(c) automatically resume the idle mode.

25. The computer program of claim 18, wherein the digital subscriber line communication system is a discrete multitone digital subscriber line communication system.

26. A computer program, residing on a computer-readable medium, for implementing an idle mode in a digital subscriber line communication system, including instructions for causing a computer to:
(a) provide data representing an idle mode modulated symbol once for each idle mode;
(b) transform such data into a single idle mode modulated symbol;
(c) repeatedly transmit the single idle mode modulated symbol from a first modem to a second modem during the idle mode.

27. The computer program of claim 26, wherein the idle mode modulated symbol has wideband spectral characteristics.

28. The computer program of claim 26, wherein the digital subscriber line communication system includes superframes having a superframe synchronization frame, further including instructions for causing a computer to transmit the superframe synchronization frame as the idle mode modulated symbol.

29. The computer program of claim 26, further including instructions for causing a computer to exit the idle mode by transmitting an exit symbol from either modem to the other modem.

30. The computer program of claim 29, wherein the exit symbol is essentially the inverse of the idle symbol.

31. The computer program of claim 26, further including instructions for causing a computer to train at least one of the modems during the idle mode using the idle mode modulated symbol.

32. The computer program of claim 26, further including instructions for causing a computer to:
(a) exit the idle mode from time to time;
(b) perform an equalization function in at least one of the modes outside of the idle mode;
(c) automatically resume the idle mode.

33. The computer program of claim 26, wherein the digital subscriber line communication system is a discrete multitone digital subscriber line communication system.

34. A computer program, residing on a computer-readable medium, for implementing an idle mode in a digital subscriber line communication system, including instructions for causing a computer to:
(a) generate an idle mode modulated symbol once for each idle mode;
(b) repeatedly transmit the idle mode modulated symbol from a first modem to a second modem; and
(c) exit the idle mode by transmitting an exit symbol from either modem to the other modem.

35. Modem circuitry for implementing an idle mode in a digital subscriber line communication modem, the circuitry having a generator for generating an idle mode modulated symbol once for each idle mode and a coupled transmit circuit for repeatedly transmitting the idle mode modulated symbol when connected to a receiver modem.

36. The system of claim 35, wherein the idle mode modulated symbol has wideband spectral characteristics.

37. The system of claim 35, wherein the digital subscriber line communication system includes superframes having a superframe synchronization frame, and wherein the superframe synchronization frame is used as the idle mode modulated symbol.

38. The system of claim 35, wherein the circuitry exits the idle mode by transmitting an exit symbol.

39. The system of claim 38, wherein the exit symbol is essentially the inverse of the idle symbol.

40. The system of claim 35, wherein the circuitry further includes a circuit for training the modem during the idle mode using a received idle mode modulated symbol.

41. The system of claim 35, wherein the circuitry:

(a) exits the idle mode from time to time;

(b) performs an equalization function in at least one of the modes outside of the idle mode;

(c) automatically resumes the idle mode.

42. The system of claim 35, wherein the digital subscriber line communication system is a discrete multitone digital subscriber line communication system.

43. Modem circuitry for implementing an idle mode in a digital subscriber line communication modem, wherein the circuitry:

(a) provides data representing an idle mode modulated symbol once for each idle mode;

(b) transforms such data into a single idle mode modulated symbol;

(c) repeatedly transmits the single idle mode modulated symbol to a coupled receiver modem during the idle mode.

44. The system of claim 43, wherein the idle mode modulated symbol has wideband spectral characteristics.

45. The system of claim 43, wherein the digital subscriber line communication system includes superframes having a superframe synchronization frame, and wherein the superframe synchronization frame is used as the idle mode modulated symbol.

46. The system of claim 43, wherein the circuitry exits the idle mode by transmitting an exit symbol.

47. The system of claim 46, wherein the exit symbol is essentially the inverse of the idle symbol.

48. The system of claim 43, wherein the circuitry further includes a circuit for training the modem during the idle mode using a received idle mode modulated symbol.

49. The system of claim 43, wherein the circuitry:

(a) exits the idle mode from time to time;

(b) performs an equalization function in at least one of the modes outside of the idle mode;

(c) automatically resumes the idle mode.

50. The system of claim 43, wherein the digital subscriber line communication system is a discrete multitone digital subscriber line communication system.

51. A modem circuit for implementing an idle mode in a digital subscriber line communication modem, including circuitry for:

(a) generating an idle mode modulated symbol once for each idle mode;

(b) repeatedly transmitting the idle mode modulated symbol from a first modem to a second modem; and (c) exiting the idle mode by transmitting an exit symbol from either modem to the other modem.

52. A method for implementing an idle mode in a digital subscriber line communication system, including the steps of:

(a) providing a non-time-varying idle mode symbol once for each idle mode;

(b) repeatedly transmitting the single idle mode symbol from a first modem to a second modem during the idle mode.

53. A computer program, residing on a computer-readable medium, for implementing an idle mode in a digital subscriber line communication system, including instructions for causing a computer to:

(a) provide a non-time-varying idle mode symbol once for each idle mode;

(b) repeatedly transmit the single idle mode symbol from a first modem to a second modem during the idle mode.

54. Modem circuitry for implementing an idle mode in a digital subscriber line communication modem, wherein the circuitry:

(a) provides a non-time-varying idle mode symbol once for each idle mode;

(b) repeatedly transmits the single idle mode symbol from a first modem to a second modem during the idle mode.

* * * * *